United States Patent [19]

Radenkovic

[11] 4,326,502
[45] Apr. 27, 1982

[54] SOLAR ENERGY COLLECTING SYSTEM

[76] Inventor: Ljubomir Radenkovic, Trg Oktob. Revol. 31, 37000 Krusevac, Yugoslavia

[21] Appl. No.: 953,040

[22] Filed: Oct. 20, 1978

Related U.S. Application Data

[63] Continuation-in-part of Ser. No. 565,863, Apr. 7, 1975, Pat. No. 4,121,566.

[51] Int. Cl.³ .............................................. F24J 3/02
[52] U.S. Cl. .................................... 126/439; 126/443
[58] Field of Search ................ 126/443, 442, 439, 438

[56] References Cited

U.S. PATENT DOCUMENTS

| | | | |
|---|---|---|---|
| 3,227,153 | 1/1966 | Godel | 126/438 |
| 3,990,430 | 11/1976 | Robertson | 126/446 |
| 4,080,954 | 3/1978 | de Wilde | 126/443 |

Primary Examiner—Samuel Scott
Assistant Examiner—G. Anderson
Attorney, Agent, or Firm—Alexis Barron

[57] ABSTRACT

A solar energy system for collecting solar energy in the form of solar radiation and for storing and utilizing the energy collected including stationary solar energy collecting units each comprising a generally concave reflective surface for reflecting solar radiation onto a plurality of energy collectors positioned within the surface, the surface and the energy collectors positioned with respect to each other to provide varying concentration of solar radiation on each of the energy collectors depending on the angle of incidence of the solar radiation on the solar energy collecting unit. Each of the energy collectors is associated with a pipe for fluid circulation and solar energy absorption through which fluid to be heated by the solar radiation is circulated. The pipe may be surrounded by a glass enclosure and the space between the pipe and the glass enclosure may be evacuated to provide insulation. The surface of the glass enclosure may be reflective to provide for further concentration of solar radiation upon the pipe. The system includes thermostatically controlled valves associated with each of the energy collectors for selectively transferring away only that fluid which has been heated to a predetermined temperature.

3 Claims, 31 Drawing Figures

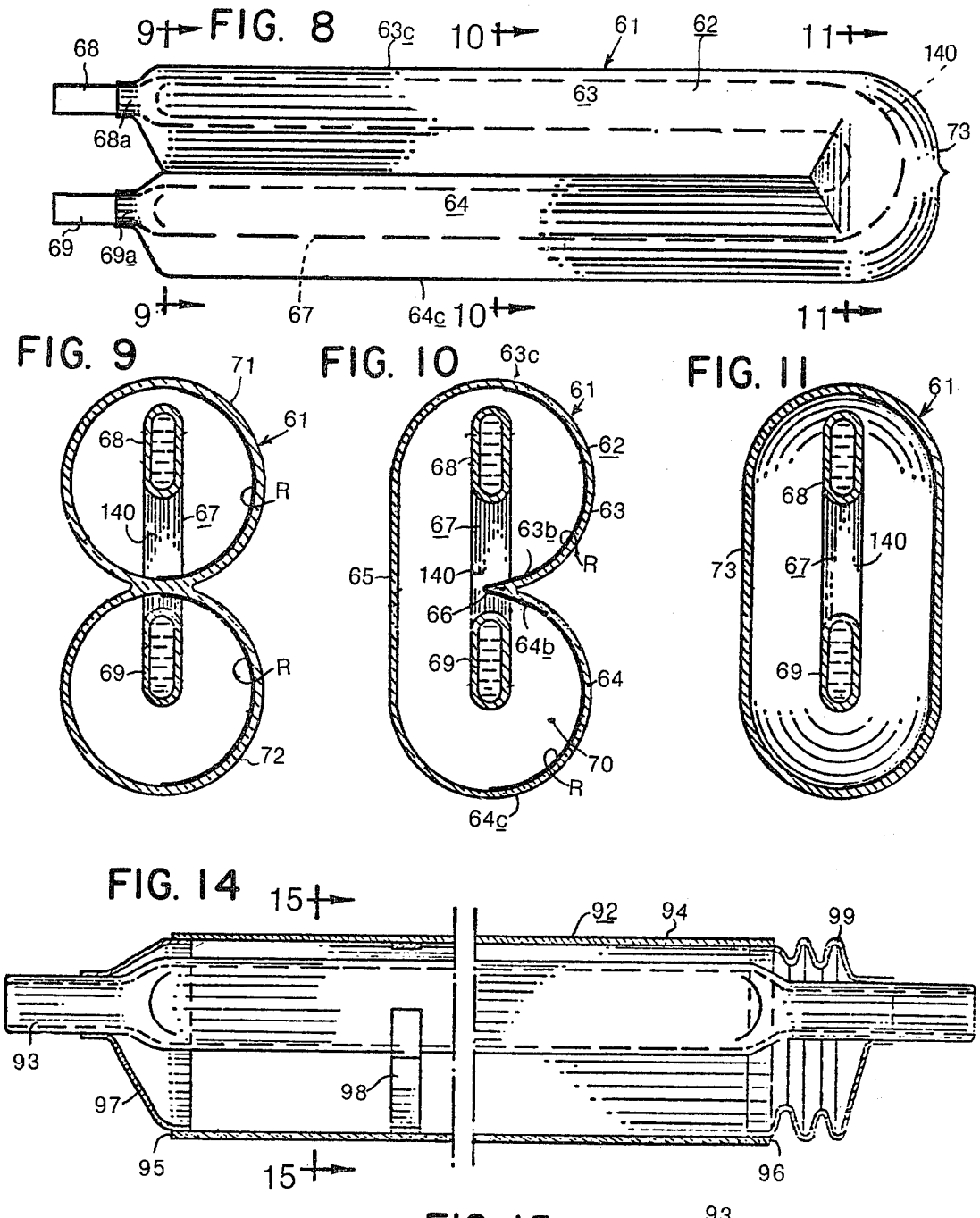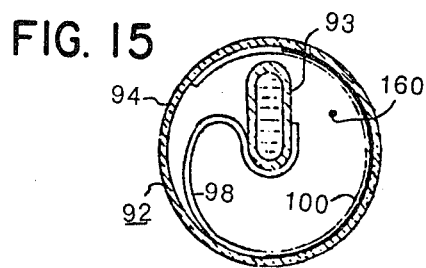

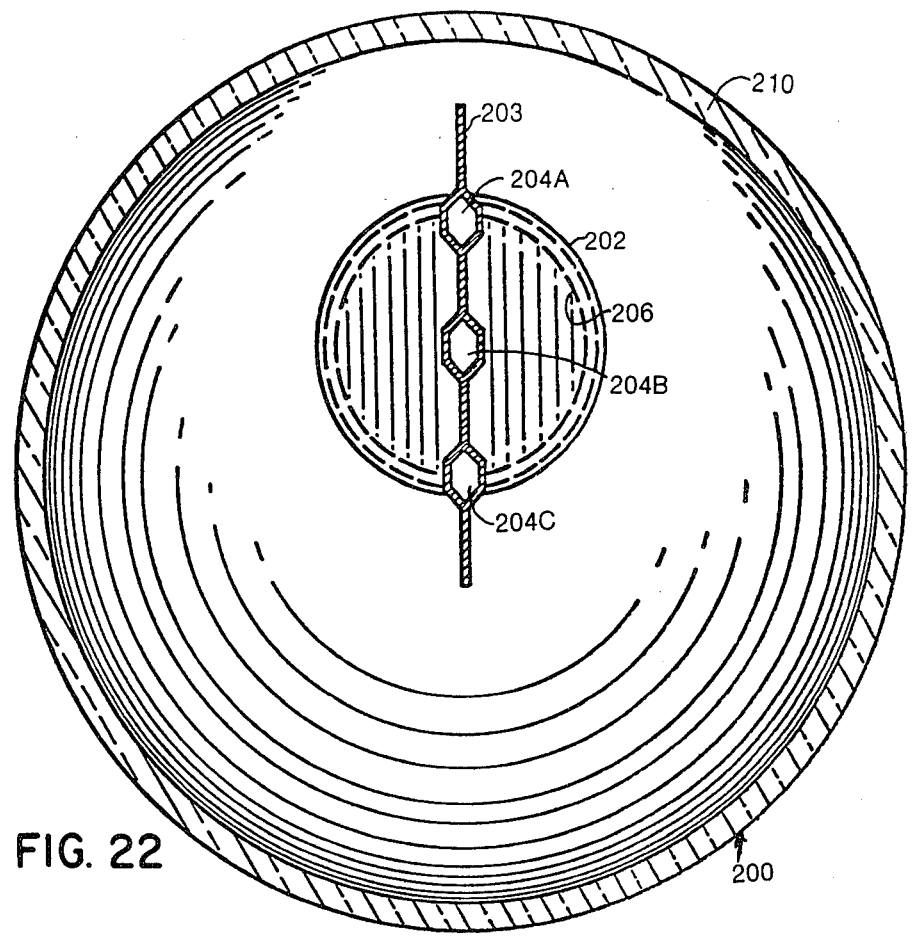
FIG. 22
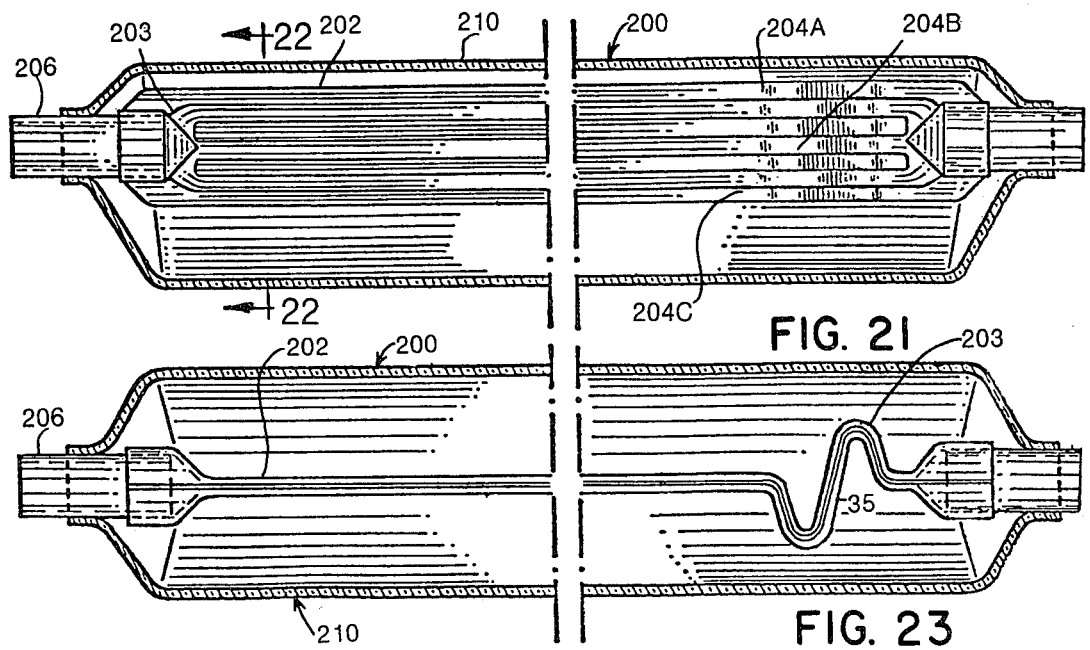
FIG. 21
FIG. 23

SOLAR ENERGY COLLECTING SYSTEM

CROSS REFERENCE TO RELATED APPLICATION

This application is a continuation-in-part of my co-pending U.S. application Ser. No. 565,863, filed Apr. 7, 1975 now U.S. Pat. No. 4,121,566.

FIELD OF THE INVENTION

This invention relates generally to collection of electromagnetic energy, more particularly to the collection of solar radiation.

REPORTED DEVELOPMENTS

Many types of solar energy collection systems use solar radiation to heat fluid. Some solar energy collection systems utilize flat plate collectors through which fluid to be heated is circulated. Such systems provide a fluid having a relatively low maximum temperature, for example, about 200° F. These systems require large storage facilities because the fluid provided has a relatively low temperature.

Some solar energy collection systems include flat plate collectors within a concave reflective surface. For example, U.S. Pat. No. 3,321,012 discloses a solar energy collector having a flat plate collector mounted within a semicylindrical reflector so that all solar radiation entering the semicylindrical reflector will fall on the flat plate collector either directly or by reflection. However, one of the problems encountered with this design is that during periods when a low flux of solar radiation enters the reflector at a small angle of incidence, such as occurs in the early morning or late afternoon, the solar radiation is dispersed over the surface of the flat plate collector and the fluid produced by the solar energy collector has a relatively low temperature.

French Pat. No. 1,165,672 discloses a solar energy collecting system comprising a concave reflecting plate which concentrates solar radiation on a pipe or a plurality of pipes which contain heat-transfer fluid. The shape of the reflecting plate is such that every plane tangent to the pipe is normal to the reflector plate. This design results in substantially all solar radiation entering the concave plate being concentrated on the aforementioned pipe or pipes. In one embodiment of the invention, the aforementioned energy collecting system is positioned within a large concave surface in a manner such that solar radiation is concentrated on the smaller concave surface of the solar energy collecting system. The larger reflecting surface may be a smooth concave surface or a surface designed so that every plane tangent to an imaginary cylinder encompassing the solar energy collecting system is normal to the larger reflecting surface. One of the problems encountered with this design is that during periods when a low flux of solar radiation enters the reflecting plate at a small angle of incidence, such as occurs in the early morning or late afternoon, the solar radiation is dispersed over the surface of the pipe or pipes and the fluid produced by the solar energy collecting system has a relatively low temperature.

Solar energy collection systems which track the sun provide generally fluids with temperatures higher than the fluids provided with stationary flat plate collectors, but such systems include sun tracking equipment having many complex mechanical parts and are relatively expensive. For example, U.S. Pat. No. 1,855,815 discloses a solar energy collection system having a plurality of pipes, each encompassed in a parabolic reflector and located at the focal axis of its respective parabolic reflector. As the incidence angle of the solar radiation changes throughout any particular day, a mechanical drive means turns each reflector in the direction of the sun to provide for concentration of solar radiation on the pipes. U.S. Pat. No. 1,162,505 also discloses a solar energy collection system including a parabolic reflector which tracks the sun and a fluid conduit at the focal axis of the parabolic reflector. Another example of a parabolic reflector which tracks the sun is disclosed in U.S. Pat. No. 2,872,915.

U.S. Pat. No. 3,915,148 discloses a lens type, as opposed to a reflector type, solar energy concentrator comprising a Fresnel lens, aligned in the east-west direction, below which extends, in the east-west direction, a plurality of individual fluid channels. Each channel has a thermostatically controlled valve which allows the fluid to flow through the channel only when the fluid temperature of the channel exceeds a threshold level. The patent discloses that as the sun angle changes with the seasons, the focus of the solar radiation is on a different pair of channels. During any one day, solar radiation is concentrated on two channels. However, the solar energy concentrator disclosed in this patent is not designed to provide a high temperature fluid during the early morning and late afternoon.

U.S. Pat. No. 3,277,153 discloses an energy collector including a transparent cylindrical tube in which is suspended an elongated U-shaped conduit for the inflow and outflow of fluid to be heated by solar radiation. A portion of the cylindrical tube is reflective and is said to concentrate solar radiation on the U-shaped conduit. The suspended conduit enters and exits at one end of the transparent tube and the other end of the transparent tube is sealed. The U-shaped portion of the conduit is freely suspended within the tube and there is a space between the transparent tube and the U-shaped portion of the conduit to allow for differential thermal expansion and contraction between the conduit and the transparent tube. The fluid circulated through the conduit flows in a U-shaped path entering at a first end of the conduit, reversing directions at the U-shaped end of the conduit, and exiting at the first end of the conduit. However, the energy collector disclosed in this patent does not provide for maximum concentration of solar radiation on the U-shaped conduit. The reflective surface is cylindrical and is not shaped to provide maximum concentration on the elongated U-shaped conduit and some of the solar radiation entering the tube is reflected out of the tube rather than on the U-shaped conduit.

It is an object of this invention to provide a solar energy collection system which can provide fluids having a high temperature through the collection period of any one day.

It is another object of this invention to provide a solar energy collecting unit which is capable of concentrating solar radiation on energy collectors throughout the day but which does not require the tracking of the sun.

It is another object of the present invention to reduce the size of the energy storage facility by using solar energy collection systems which provide fluid having a high temperature.

It is another object of this invention to provide a solar energy collection system which can be employed for different purposes such as distillation, stream production, heating and air-conditioning systems, and direct conversion of solar energy to electricity by employing solar cells.

Another object of the present invention is to provide an energy collector which is capable of insulating a fluid circulation pipe and providing increased concentration of solar radiation on the pipe.

SUMMARY OF THE INVENTION

In accordance with the present invention there is provided a solar energy system for collecting solar energy in the form of solar radiation and for storing and utilizing the energy collected comprising a stationary solar energy collecting unit comprising a generally concave reflective surface for reflecting solar radiation onto energy collectors positioned within the concave reflective surface and a means for selectively transferring energy received by the collector away from the collectors. The energy so collected may be utilized to heat and cool a building.

The generally concave surface, which concentrates solar radiation onto energy collectors, has internal reflective surfaces and comprises a trough including two parallel concavely shaped floors, each floor having a bottommost portion, an outer side portion and an inner side portion. Energy collectors extend vertically from each of the bottommost portions of the trough and are of predetermined height. The trough has exterior side walls which extend from each of the outer side portions of the floors and have an intermediate portion and an upper portion, the intermediate portion being outwardly curved and the upper portion being inwardly curved. The upper portion and at least a segment of the intermediate portion extends beyond the height of the energy collectors. The trough has an internal wall positioned between the collectors and terminating below the height of the collectors. The collectors are one or more flat plate collectors.

In another embodiment of the invention, there is provided a solar energy collector comprising a sealed glass enclosure, the interior of which may be evacuated. An elongated U-shaped pipe including two elongated portions and a connecting portion which connects the two elongated portions at one end extends within the glass enclosure. The pipe provides for fluid circulation and energy absorption. The glass enclosure includes a wall portion capable of transmitting solar radiation into the enclosure and another portion which includes a plurality of concavely shaped walls, these walls being reflective and positioned with respect to the pipe to concentrate solar radiation on the pipe. One of the concave reflective walls concentrates solar radiation on one elongated portion of the pipe and another of the concave reflective walls concentrates solar radiation on another elongated portion of the pipe. A plurality of the above described collectors may be positioned in a collecting unit having a generally concave reflective surface. The collectors are positioned with respect to the generally concave reflective surface so that the wall which is capable of transmitting solar radiation faces the reflective surface of the collecting unit. Fluid may be circulated selectively to the collector or collectors receiving a predetermined amount of solar radiation.

In another embodiment of the invention, there is provided a solar energy collector having a pipe for fluid circulation and solar energy absorption enclosed by an elongated hollow glass enclosure. The energy collector is provided with a seal to seal the elongated enclosure with respect to the pipe and to provide an insulating space between the glass enclosure and the pipe. The seal is bellow-type and is made of a resilient material to provide for the relative expansion and contraction of the pipe with respect to the elongated chamber. A portion of the interior surface of the glass enclosure may be coated with a reflective material to provide for concentration of solar radiation upon the pipe. Alternatively, the glass enclosure may be one-way transmissive to solar radiation. The one-way transmissive enclosure allows solar radiation to enter the glass enclosure, but once the solar radiation enters the enclosure, a substantial portion of the solar radiation is reflected upon the pipe within the glass enclosure. A plurality of the above described collectors may be positioned in a collecting unit having a generally concave reflective surface. Fluid may be circulated selectively to the collector or collectors receiving a predetermined amount of solar radiation.

The present invention provides a solar energy collecting system which can heat fluids to a temperature as high as 400°–480° F. throughout the collection period of any one day. In order to provide the high temperature fluid, it is not essential for the solar energy collecting units to track the sun. In the present invention solar radiation is concentrated upon a plurality of energy collectors located in a concave surface, the amount of solar energy received by at least one of the collectors being substantially different, at least some of the time during operation, than the amount received by other collectors. The present invention is provided with a pump and solenoid valves for selectively transferring energy received by the collectors away from collectors receiving a predetermined amount of solar radiation.

By providing a high temperature fluid, the size of the storage facility included in the solar energy system of the present invention may be reduced.

DESCRIPTION OF THE DRAWINGS

FIG. 8 shows an alternative embodiment of a solar energy collector.

FIG. 9 shows a view along 9—9 of FIG. 8.

FIG. 10 shows a view along 10—10 of FIG. 8.

FIG. 11 shows a view along 11—11 of FIG. 8.

FIG. 14 shows another embodiment of a solar energy collector.

FIG. 15 shows a view along 15—15 of FIG. 14.

FIG. 21 shows another embodiment of a solar energy collector.

FIG. 22 is a transverse section along 22—22 of FIG. 21 on an enlarged scale with respect to FIG. 21.

FIG. 23 is a plan view of the collector shown in FIG. 21.

DETAILED DESCRIPTION OF INVENTION

Figure 1:
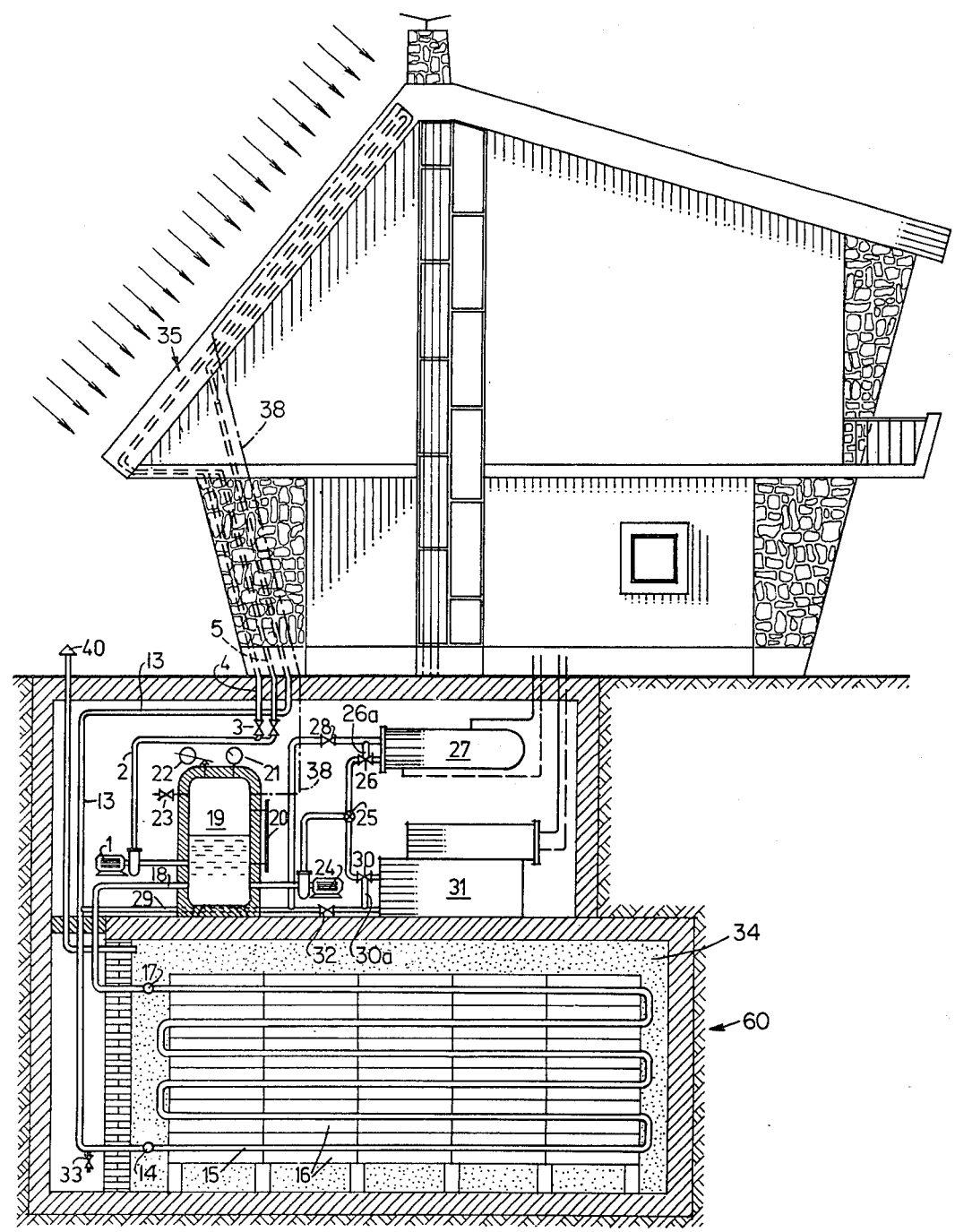
FIG. 1 shows a house equipped with a solar energy system of the present invention.

FIG. 1 shows a solar energy system for collecting, storing and utilizing solar energy. Multispeed pump 1 pumps fluid from balancing tank 19 through pipe 2 and solenoid valves 3 and distributes the fluid to pipes 4, 5, 6 and 7, the latter two being shown in FIG. 2, and then to one or more solar collectors 35 on the roof of the house (heating of the fluid by the solar collecting units 35 is described in detail below). Hot fluid, heated by solar collecting units 35, flows through return pipe 13, provided with a drainage valve 33, to the lower header 14 and through circulating pipes 15 surrounded by brick blocks 16, of storage facility 60. The fluid flows from upper header 17 through pipe 18 to balancing tank 19.

Balancing tank 19 is equipped with level gauge 20, manometer 21, safety valve 22 and charging valve 23. Air ventilation pipe 38 connects the upper part of solar collecting units 35 and balancing tank 19. Brick blocks 16 are surrounded with insulation 34. Ventilation pipe 40 connects the storage facility 60 to the outside to allow free evaporation of any remaining water in the storage facility.

Second circulation pump 24 pumps hot fluid from balancing tank 19 to change-over valve 25 through which fluid is circulated to three-way modulating valve 26 which allows hot fluid to be circulated either to heat exchanger 27 for the heating system or to heat exchanger by-pass pipe 26a, and then through one-way valve 28 and return pipe 29 to main return pipe 13 which delivers the fluid through storage facility 60 to balancing take 19. Change-over valve 25 may also direct hot fluid to three-way modulating valve 30 which allows fluid to be circulated either to absorption chiller 31 for the air-conditioning system or to absorption chiller by-pass pipe 30a and then through one-way valve 32 and pipe 29 to main return pipe 13 which delivers fluid through storage facility 60 to balancing tank 19.

Pumps 1 and 24, balancing tank 19, heat exchanger 27 and absorption chiller 31, with attached pipes and valves, may be located in the basement of the house, as shown. Storage 60 may be located under the equipment room as shown in FIG. 1.

Figure 2:
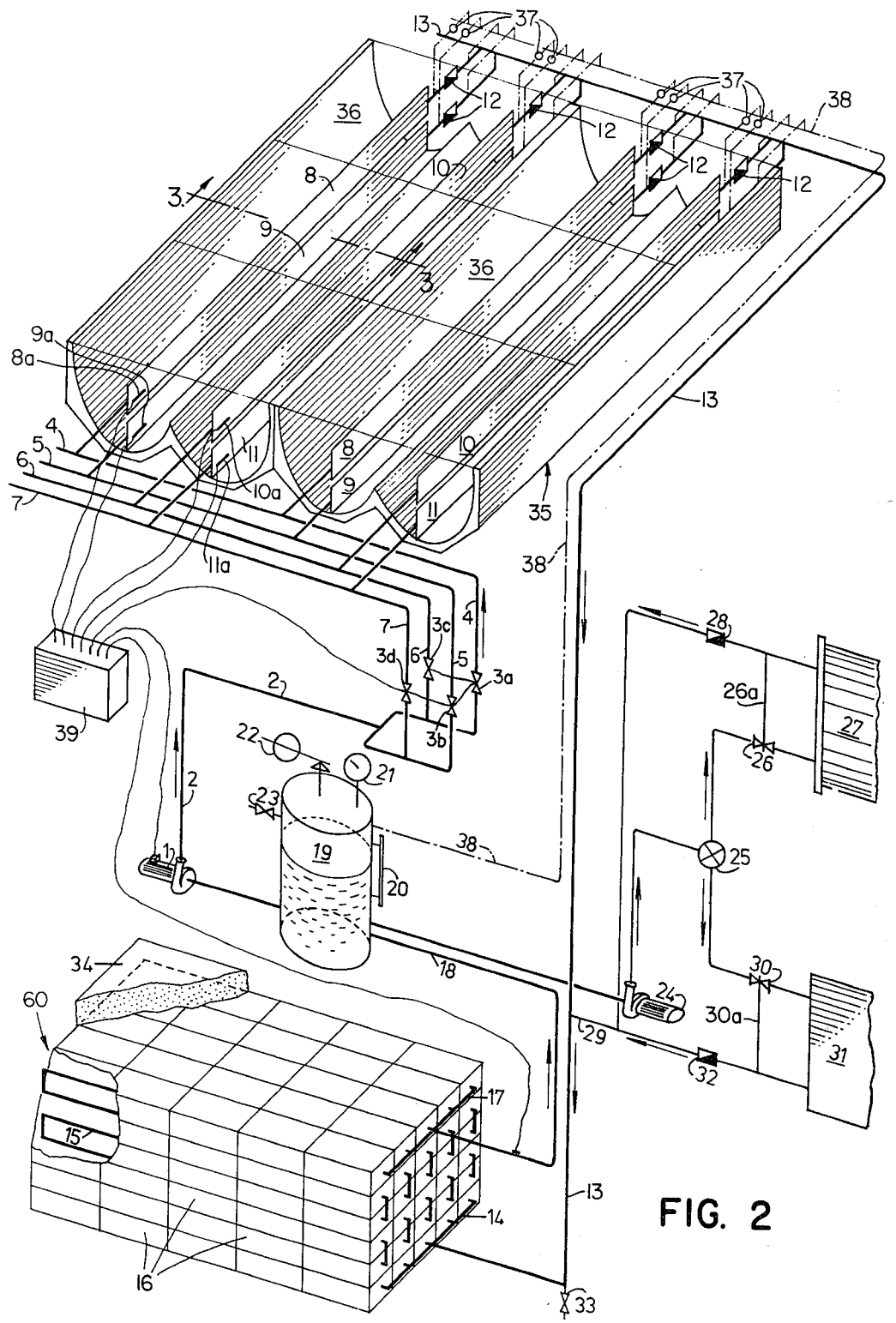
FIG. 2 shows a diagrammatic view of the solar energy system of the present invention.

Referring to FIG. 2, pump 1 pumps fluid from balancing tank 19 through pipe 2 to four solenoid valves 3a, 3b, 3c and 3d. Solenoid valve 3a opens and pump 1 starts when thermostat 8a signals that a predetermined temperature has been reached on one of collector plates 8, and fluid is circulated through pipe 4 to the collector plates 8 and through one-way valves 12 to main return pipe 13, lower header 14, circulating pipes 15, upper header 17 and through pipe 18 to balancing tank 19. When thermostat 9a signals that collector plates 9 have reached the desired high temperature, solenoid valve 3b opens and the output of multispeed pump 1 is increased and fluid flows through pipes 4 and 5 to respective collector plates 8 and 9, through one-way valves 12 to main return pipe 13 and through storage 60 to balancing tank 19. Multispeed pump 1 can be a single variable volume rate pump, as shown, or its function can be accomplished by a plurality of pumps each having a fixed volume rate. Fluid is circulated to collector plates 10 and 11 when thermostats 10a and 11a signal that a predetermined temperature has been reached on collector plates 10 and 11. When any thermostat 8a, 9a, 10a and 11a signals that the associated collector plates are no longer at the predetermined temperature, the respective solenoid valve 3a, 3b, 3c and 3d closes and the output of multispeed pump 1 is decreased.

Figure 7:
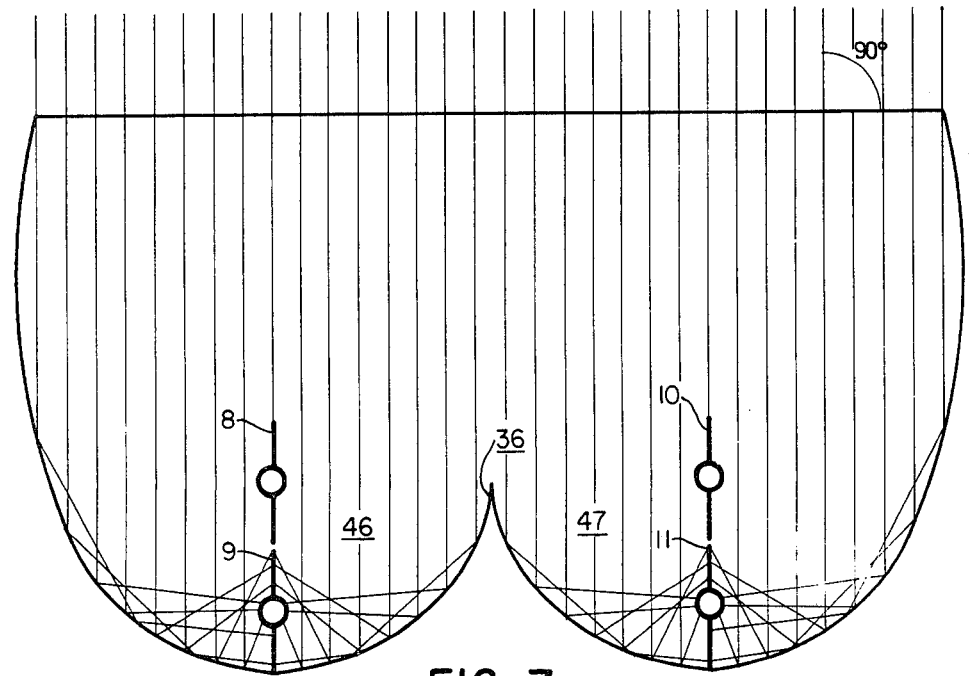
FIG. 7 shows solar radiation incident at an angle of 90° with the section of FIG. 3 shown diagrammatically.

In the midday, as shown in FIG. 7, collector plates 9 and 11 have solar radiation concentrated thereon and fluid is directed to these plates through pipes 5 and 7 (shown in FIG. 2). During the late afternoon only plate 10 receives sufficient solar radiation and fluid is circulated through pipe 6 to plate 10 (shown in FIG. 2).

When the temperature on all collector plates falls below a predetermined level of economical collection, multispeed pump 1 stops and all solenoid valves 3a, 3b, 3c and 3d close. After a period of time, a time switch actuates the opening of all four solenoid valves to enable drainage of fluid from collecting units to prevent heat loss and freezing of the fluid during cold weather.

One-way vacuum valves 37 provide free connection of upper part of collecting plates 8, 9, 10 and 11 with the upper part of balancing tank 19 through ventilation pipe 38 to allow drainage of fluid to balancing tank 19. Storage pipes 15 are surrounded by brick blocks 16 and insulated with insulation 34. Control box 39 receives signals indicating the temperature of collector plates 8, 9, 10 and 11 and of the fluid in the storage facility 60 and activates solenoid valves 3a, 3b, 3c and 3d and multispeed pump 1.

As shown in FIG. 2, there are two solar energy collecting units 130 and 132 located on the roof of the house. The number of solar energy collecting devices should be matched to the energy requirements of the structure with which they are used. Each of the collector plates 8, 9, 10 and 11 in solar energy collecting units 130 and 132 includes fluid pipes 4, 5, 6 and 7 through which fluid may be circulated. Pipe 4 is a fluid pipe to a set of collector plates 8 in solar energy collecting unit 130 and in solar energy collecting unit 132 which receive substantially the same amount of solar energy throughout the day. Likwise, pipe 5 is a fluid pipe to collector plates 9 in solar energy collecting units 130 and 132; pipe 6 is a fluid pipe to collector plates 10 in solar energy collecting units 130 and 132; and pipe 7 is a fluid pipe to collector plates 11 in solar energy collecting units 130 and 132. Valves 3a, 3b, 3c and 3d are associated respectively with fluid pipes 4, 5, 6 and 7 to allow or terminate circulation of fluid to their respective set of collector plates 8, 9, 10 and 11. Multispeed pump 1 is capable of increasing the rate of fluid flow as the number of valves 3a, 3b, 3c and 3d allowing flow increases and is capable of decreasing the rate of fluid flow as the number of valves 3a, 3b, 3c and 3d terminating flow increases.

Figure 3:
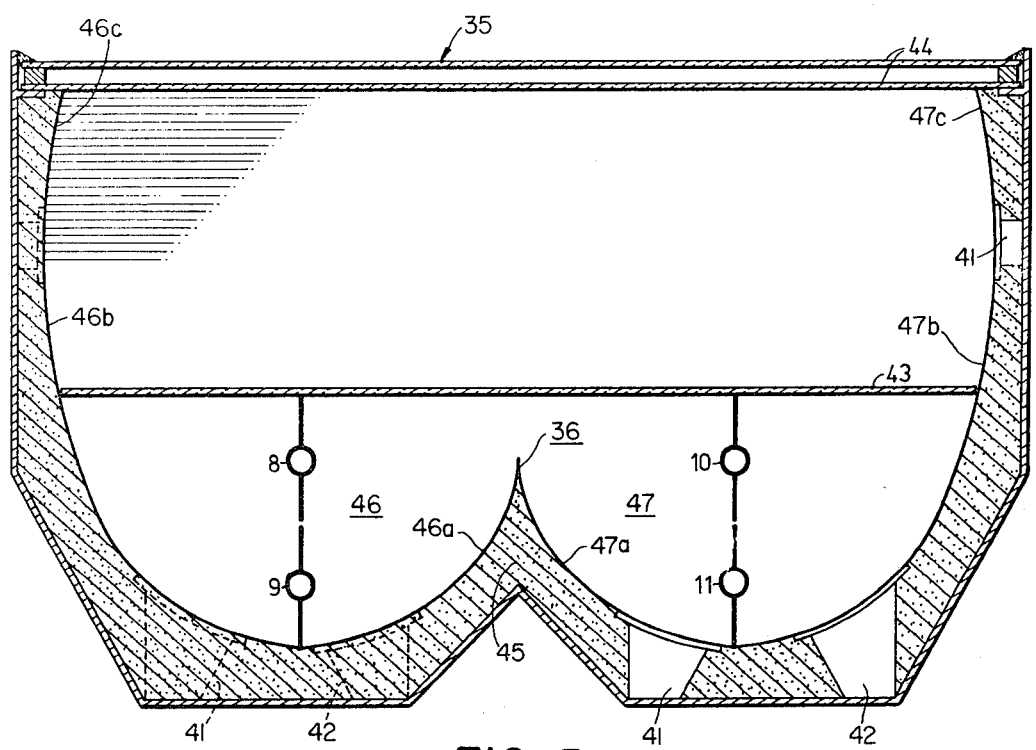
FIG. 3 shows a section of the solar energy collecting unit taken along lines 3—3 of FIG. 2.

As shown in FIG. 3, solar energy collecting unit 35 comprises trough 36 having two parallel concavely shaped reflecting surfaces 46 and 47 including inner reflecting surfaces 46a and 47a and outer reflecting surfaces 46b and 47b terminating in an inwardly projecting surface 46c and 47c. The solar energy collector plates 8 and 9, 10 and 11 extend vertically from the bottoms of the concavely shaped reflecting surfaces 46 and 47. Trough 36 is surrounded with insulation 45 and supported with supports 41 and 42. The collector plates 8, 9, 10 and 11 are insulated with glass plate 43 and double glass plate 44 at the top of the trough.

Figure 4:
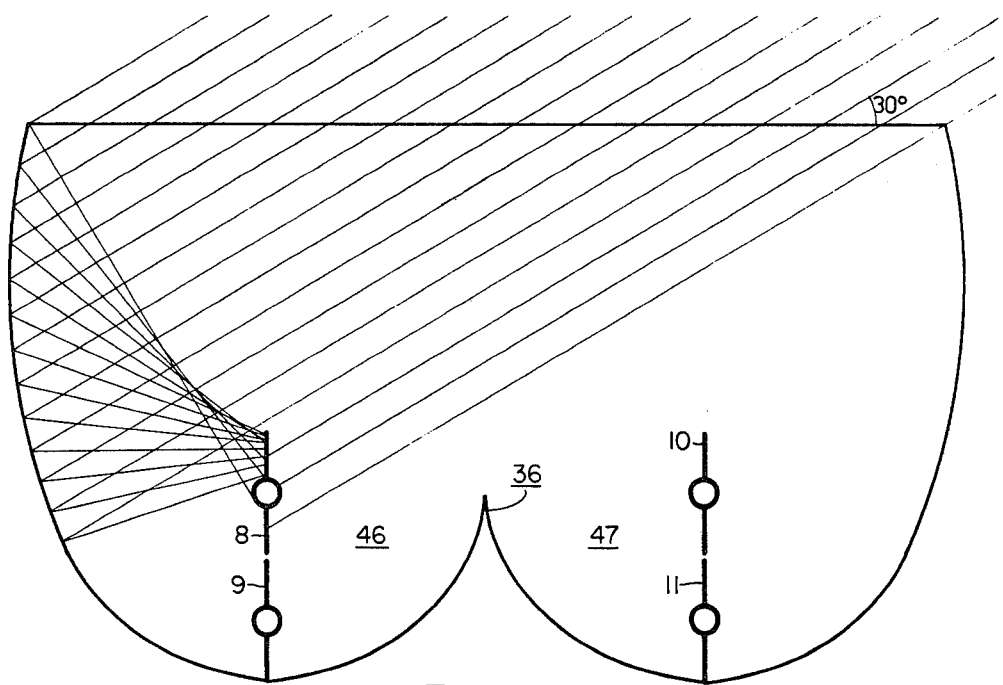
FIG. 4 shows solar radiation incident at an angle of 30° with the section of FIG. 3 shown diagrammatically.
Figure 5:
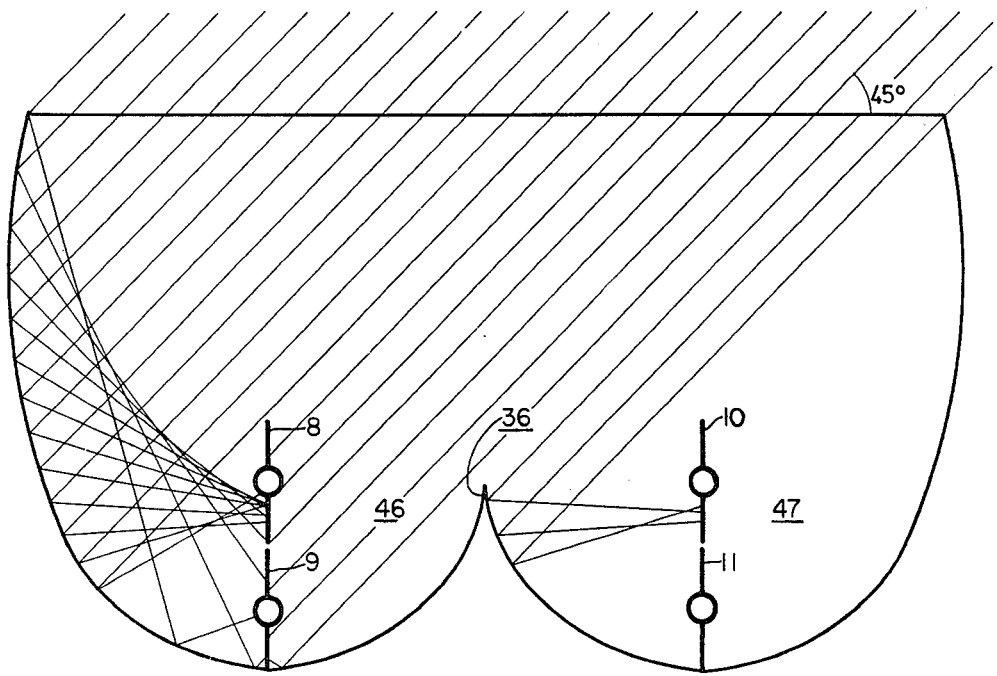
FIG. 5 shows solar radiation incident at an angle of 45° with the section of FIG. 3 shown diagrammatically.

FIG. 4 shows the incidence of solar radiation during the morning. Solar radiation incident at a 30° angle with the trough is concentrated on collector plate 8. As shown in FIG. 5, solar radiation incident at a 45° angle with the trough is concentrated principally on collector plates 8 and 9 and some of the solar radiation begins to heat collector plate 10.

Figure 6:
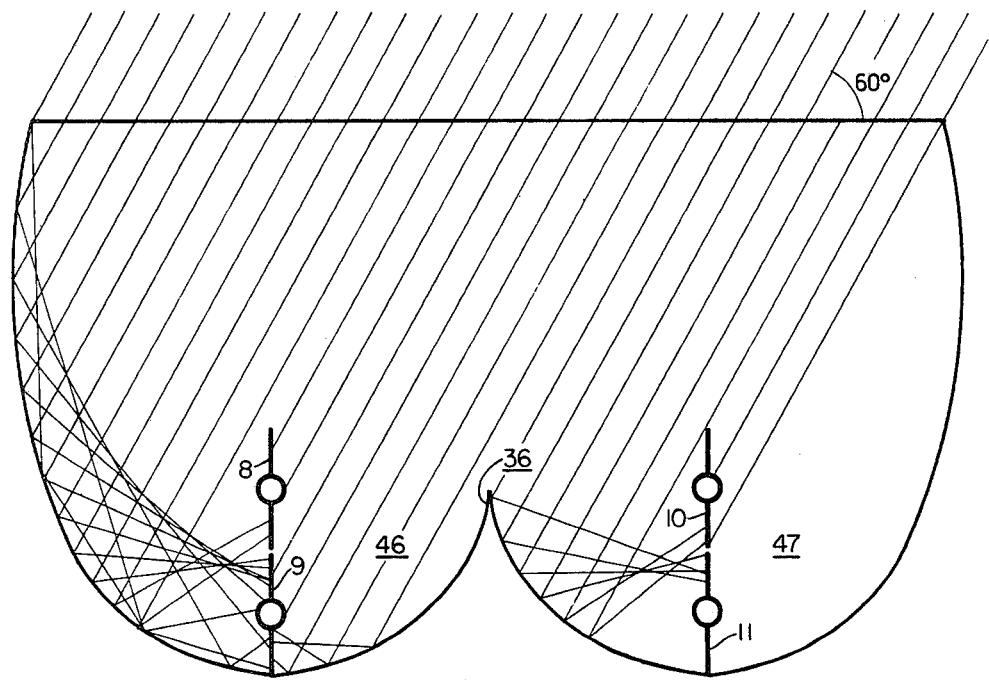
FIG. 6 shows solar radiation incident at an angle of 60° with the section of FIG. 3 shown diagrammatically.

As shown in FIG. 6, solar radiation incident at a 60° angle to the trough is concentrated mainly on collector plates 9 and 11 and collector plates 8 and 10 are exposed to very small amounts of solar radiation. As shown in FIG. 7, solar radiation incident at a 90° angle with trough 36 is concentrated on collector plates 9 and 11. During the afternoon, as the angle of incidence of solar radiation changes, the solar radiation is similarly concentrated in varying amounts on collector plates 8, 9, 10 and 11.

Fluid having a low vapor pressure at the operating temperatures of the solar energy collecting system and good heat transfer properties is recommended. Examples of such fluids are liquids sold under the trademarks DOWTHERM-A (boiling point of about 496° F. and melting point of 53° F.) and DOWTHERM-E (boiling point of about 350° F. and a melting point of about 0° F.).

The system can be operated under slight pressure by including in balancing tank 19 a pressurized neutral gas which deters or prevents the evaporation of the fluid.

A central control box (not shown), which can be conveniently located in the house, can, in addition to performing the functions of control box 39, also control the heating and air conditioning systems for regulating the temperature inside the house.

The collector plates 8, 9, 10 and 11 can be coated with a material having high short-wave absorptance and low long-wave emittance. The reflecting surfaces of the trough can be manufactured from metal sheets coated with a reflecting material which is mirror polished.

The solar collecting units of the present invention may be positioned on the roof of a house and inclined and facing south at an angle corresponding to the latitude in the northern hemisphere and inclined and facing north at an angle corresponding to the latitude in the southern hemisphere.

The above-described solar energy collecting system provides a system which can heat fluids to a temperature as high as 400–480° F. throughout the collection period of any one day. Solar radiation is concentrated on a plurality of energy collectors located in a concave reflective surface, and fluid is circulated to an energy collector only when the energy collector is receiving a predetermined amount of solar radiation. Thus, even at times of the day such as in the early morning or the late afternoon, when the angle of incidence of solar radiation is small, the solar energy collecting unit including a plurality of flat plate collectors can provide fluids having high temperature.

Hereinafter described are additional embodiments of energy collectors which may be positioned within concave reflective surfaces so that energy collected may be selectively transferred away from these collectors. The below-described collectors have advantages over the previously described flat plate collectors in that they provide for further concentration of solar radiation by providing a secondary reflective surface within the generally concave reflecting surface of the collecting unit. The below-described collectors also have the advantage that the pipe for fluid circulation and solar energy absorption is surrounded by a glass enclosure which provides a space that allows for the insulation of the pipe from the environment external to the glass enclosure. The space between the pipe and the glass enclosure may be evacuated. The solar collectors below-described provide for concentration of the solar radiation and can, in some instances, provide fluid having a higher temperature than provided by the flat plate collectors previously described.

FIGS. 8–13 show an alternative embodiment of a solar energy collector which may be positioned in a solar energy collecting unit which in turn may be positioned on the roof of a house and connected with the solar energy system previously described.

As shown in FIGS. 8, 9, 10 and 11 solar energy collector 61 comprises glass enclosure 62 having first elongated concavely shaped wall 63 and second elongated concavely shaped wall 64 which extend generally in parallel relation to each other. Each wall 63 and 64 includes outerside portions 63c and 64c. Wall 65 which is transmissive to solar radiation extends from outerside portion 63c of first wall 63 to outerside portion 64c of second wall 64. Innerside portions 63b and 64b of walls 63 and 64 are joined to provide wall 66 terminating at or below transmissive wall 65.

Elongated portion 68 of elongated U-shaped pipe 67 extends into the interior of glass enclosure 62; elongated portion 68 of elongated U-shaped pipe 67 reverses direction at connecting portion 140; and elongated portion 69 of U-shaped pipe 67 extends from the interior of glass enclosure 62. Portion 68 of U-shaped pipe 67 is positioned between transparent wall 65 and concavely shaped wall 63. Portion 69 of elongated U-shaped pipe 67 is positioned between transmissive wall 65 and concavely shaped wall 64. Elongated U-shaped pipe 67 is positioned with respect to glass enclosure 62 to provide space 70 which is capable of insulating U-shaped pipe 67 from the environment exterior to the glass enclosure 62. It is preferred that space 70 be evacuated to provide better insulation of U-shaped pipe 67.

A portion of concavely shaped walls 63 and 64 is coated with a reflective material R, such as silvering, to reflect solar radiation entering through transmissive wall 65 onto pipe 67. It should be appreciated that a substantial amount of radiation entering glass enclosure 62 is reflected respectively by concavely shaped walls 63 and 64 onto portions 68 and 69 of elongated U-shaped pipe 67. The amount of solar radiation escaping glass enclosure 62 is minimized by the concave shape of walls 63 and 64.

As shown in FIG. 8, the collector 61 includes a structure whereby fluid can be pumped through first portion 68 of elongated U-shaped pipe 67 and then through second portion 69 of elongated U-shaped pipe 67. It should be understood that the functions of portions 68 and 69 of U-shaped pipe 67 can be reversed to provide for circulation of fluid in the opposite direction. It is preferred that U-shaped pipe 67 be metal coated with a material having a high shortwave absorptance and low longwave emittance.

As shown in FIGS. 8 and 9, the left portion of glass enclosure 62 of collector 61 narrows in diameter to nipples 68a and 69a which fit snugly and respectively around portions 68 and 69 of elongated U-shaped pipe 67 to provide for sealing of glass enclosure 62 with respect to pipe 67. At the left portion of glass enclosure 62, the glass enclosure 62 is shaped in two parallel circles 71 and 72 which decrease in diameter as nipples 68a and 69a of the glass enclosure 62 seal portions 68 and 69 of pipe 67. As shown in FIG. 11, the right portion of glass enclosure 62 comprises a dome-shaped cap 73 seals the right portion of collector 61.

The material which comprises glass enclosure 62 and the material which comprises pipe 67 may hve different coefficients of expansion. The above structure provides for the relative expansion and contraction of pipe 67 with respect to glass enclosure 62 without damage to collector 61 such as cracking or breaking.

Figure 12:
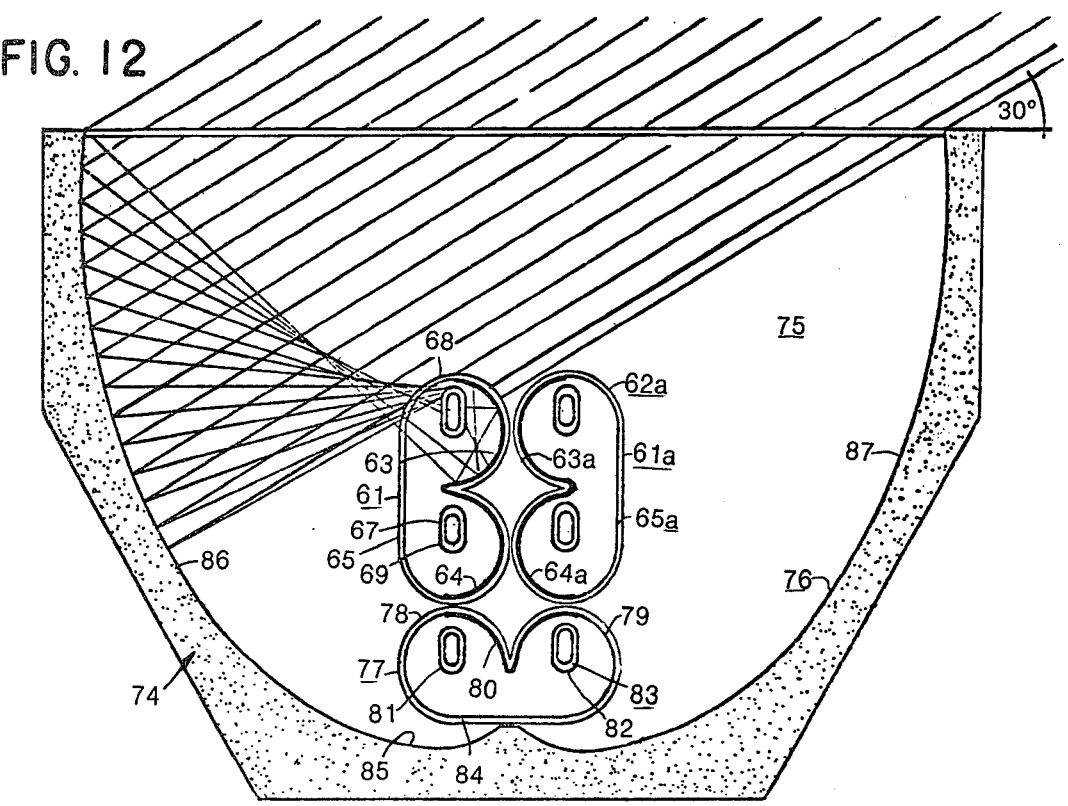
FIG. 12 shows a schematic of a solar energy collecting unit with solar radiation incident at an angle of 30° with the collecting unit.

FIG. 12 shows an alternative embodiment of a solar energy collecting unit which may be positioned on the roof of the house and connected with the solar energy system previously described. Solar energy collecting unit 74 comprises trough 75 having a generally concave shape and having reflective surface 76. Positioned within trough 75 are a plurality of energy collectors 61, 61a and 77. Collector 61 is identical to collector 61 shown in FIG. 8. Collector 61a is identical to collector 61 except that in collector 61a the reflective walls 63a and 64a of the glass enclosure 62a face an opposite direction than do the reflective walls 63 and 64 of collector 61. As is shown in FIG. 12 and shown in FIG. 13 in expanded form, collector 77 has a structure similar to that of collector 61 and collector 61a. Concave walls 78 and 79 of collector 77 have a portion thereof coated with a reflective material 80 such as silvering. Pipe 83 for fluid circulation and solar energy absorption includes two portions 81 and 82 which are centered within their respective concave walls 78 and 79 of collector 77 whereas in collector 61, portions 68 and 69 of pipe 67 are skewed slightly with respect to walls 63 and 64.

As shown in FIG. 12, solar energy collector 77 is positioned within trough 75 so that wall 84 which is transmissive to solar radiation faces downwardly toward bottommost portion 85 of trough 75. Energy collector 61 is positioned above concave wall 78 of collector 77 and is positioned so that wall portion 65 which is transmissive to solar radiation faces toward outerside portion 86 of trough 75. Energy collector 61a is positioned above concave wall 79 of collector 77 and is positioned so that wall 65a of solar energy collector 61a which is transmissive to solar radiation faces toward outerside portion 87 of trough 75.

FIG. 12 shows solar radiation entering solar energy collecting unit 74 with an incidence angle of 30°. The incoming solar radiation is reflected from outerside portion 86 of trough 75 onto energy collector 61. Some of the solar radiation is reflected by trough 75 directly upon portion 68 of pipe 67 and some of the solar radiation radiation is reflected by trough 75 to concave reflective wall 63 which, in turn, reflects solar radiation to portion 68 of pipe 67. The solar radiation does not impinge in any substantial amount onto energy collectors 61a or 77. When the temperature of energy collector 61 reaches a predetermined temperature, fluid is circulated through portions 68 and 69 of pipe 67.

It should be understood that as the angle of incidence of solar radiation impinging collecting unit 74 changes throughout the day, the solar radiation is concentrated on one or more collectors 61, 61a and 77 positioned within trough 75 in varying concentration. As the temperature of any collector 61, 61a and 77 reaches a predetermined temperature, fluid is circulated through that collector.

Figure 13:
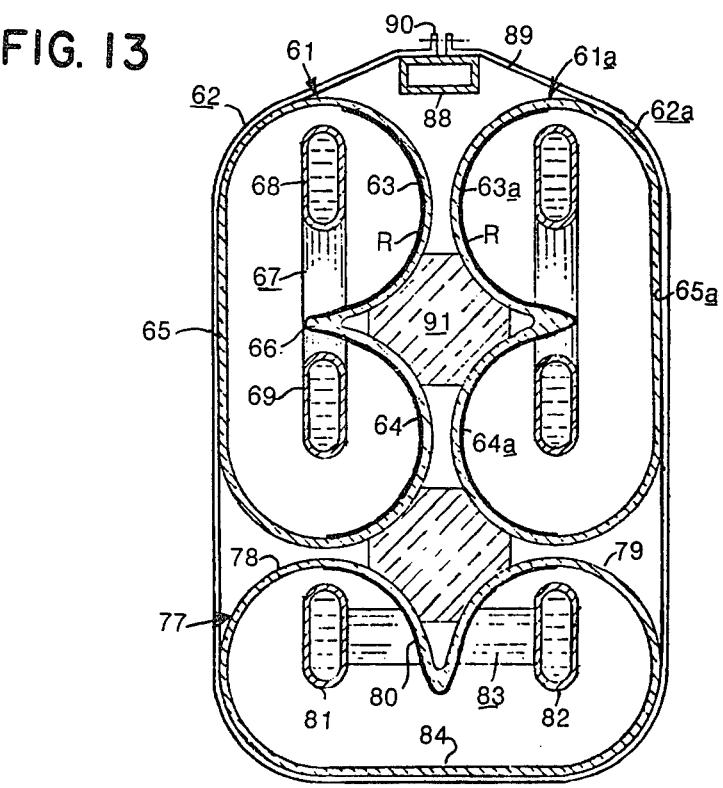
FIG. 13 shows an enlarged view of the plurality of solar energy collectors drawn diagrammatically in FIG. 12.

As shown in FIG. 13, energy collectors 61, 61a and 77 are supported with supporting member 88, tape 89 and clip 90. The position of energy collectors 61, 61a and 77 with respect to each other is maintained by spacing members 91 which also serve to insulate the energy collectors 61, 61a and 77 from each other.

Another embodiment of an energy collector is shown in FIGS. 14 and 15. Energy collector 92 includes pipe 93 for fluid circulation and solar energy absorption encompassed by an elongated hollow glass enclosure 94 which is a cylindrical tube having ends 95 and 96. End 95 of glass enclosure 94 is sealed with respect to pipe 93 by conical seal 97 which is made of metal. However, seal 97 can be made of plastic or other material which is capable of sealing end 93 of glass enclosure 94. Glass enclosure 94 is supported near its midsection with clip 98 which can be made of a resilient material such as spring steel. End 96 of glass enclosure 94 is sealed with respect to pipe 93 by flexible bellow-type expansion seal 99 which is capable of allowing relative expansion and contraction between glass enclosure 94 and pipe 93. Seal 99 comprises a resilient material. As shown in FIG. 15, one-half of the circumference of the glass enclosure 94 is coated with a reflective material 100. Space 160 provides for insulation of pipe 93 from the environment external to glass enclosure 94 and may be evacuated.

It should be understood that collector 92 is advantageous because glass enclosure 94 can be fabricated from standard cylindrical glass tubing rather than having to be fabricated to specific proportions as does glass enclosure 62 of collector 61 shown in FIG. 8. Moreover, seals 97 and 99, pipe 93 and glass enclosure 94 can be assembled in a relatively simple manner. It should also be appreciated that flexible bellow-type seal 99, provides advantageously a structure that can readily adjust to dimensional changes which result from temperature changes.

Figure 16:
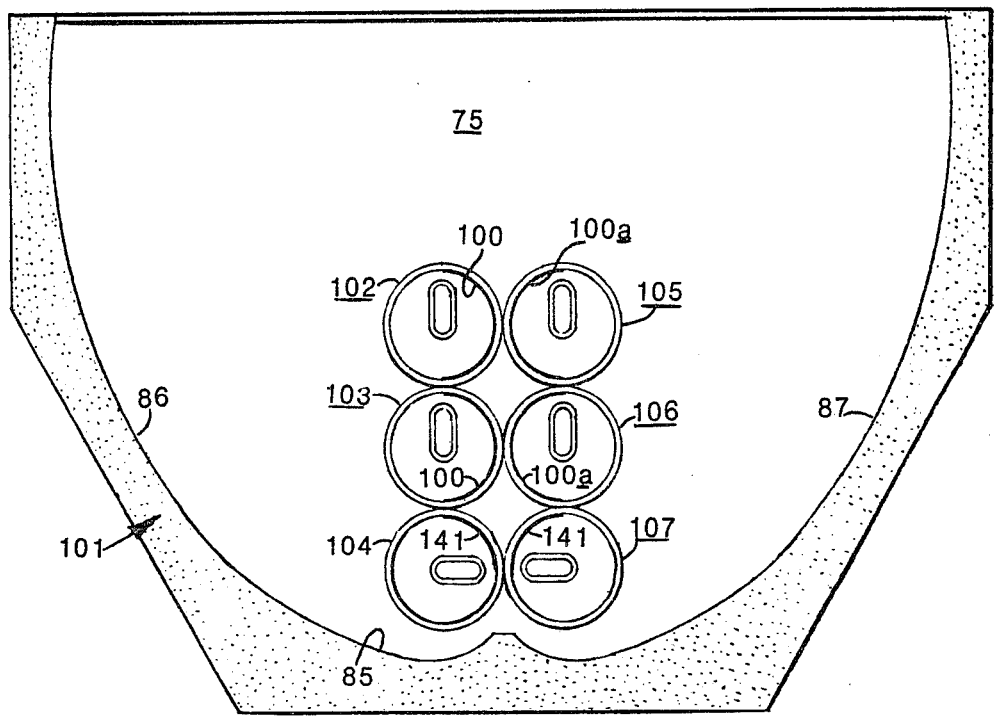
FIG. 16 shows another embodiment of a solar energy collecting unit.

Another embodiment of a solar energy collecting unit is shown in FIG. 16. Energy collecting unit 101 utilizes a trough 75 identical to trough 75 shown in FIG. 12. Energy collectors 102, 103, 104, 105, 106 and 107 of the type shown in FIG. 14 are positioned within trough 75. Energy collectors 102 and 103 are identical to collector 92 shown in FIG. 14. Collectors 105 and 106 are identical to collector 92 shown in FIG. 14, except that the reflective coating 100a on collectors 105 and 106 is applied to the wall opposite to the wall on which reflective coating 100 is applied to in collector 92. Collectors 104 and 107 are similar to collector 92, except that only one quarter of the circumference of glass enclosure 94 is coated with a reflective coating 141. Collectors 102 and 103 are positioned within trough 75 so that their reflective surfaces face toward outerside portion 86 of trough 75. Collectors 105 and 106 are positioned within trough 75 so that their reflective surfaces face toward outerside portion 87 of trough 75. Collectors 104 and 105 are positioned within trough 75 so that their reflective surfaces face downwardly toward bottommost portion 85 of trough 75. It should be understood that conventional means for supporting collectors 102, 103, 104, 105, 106 and 107 can be utilized.

Energy collecting unit 101 provides for the concentration of solar radiation on collectors 102, 103, 104, 105, 106 and 107 located within concave reflective trough 75. It should be understood that as the angle of incidence of solar radiation changes throughout the day, solar radiation is concentrated in varying amounts on different collectors 102, 103, 104, 105, 106 and 107 during the day. When the temperature of any collector 102, 103, 104, 105, 106 and 107 reaches a predetermined level, fluid is selectively circulated through that collector.

In collecting unit 101 each energy collector 102, 103, 104, 105, 106 and 107 can have a separate circuit for circulation of fluid therethrough. However, each pair 102 and 103, 104 and 107, and 106 and 105 of energy collectors can be joined at one end to provide for circulation of fluid to pairs of collectors.

Figure 17:
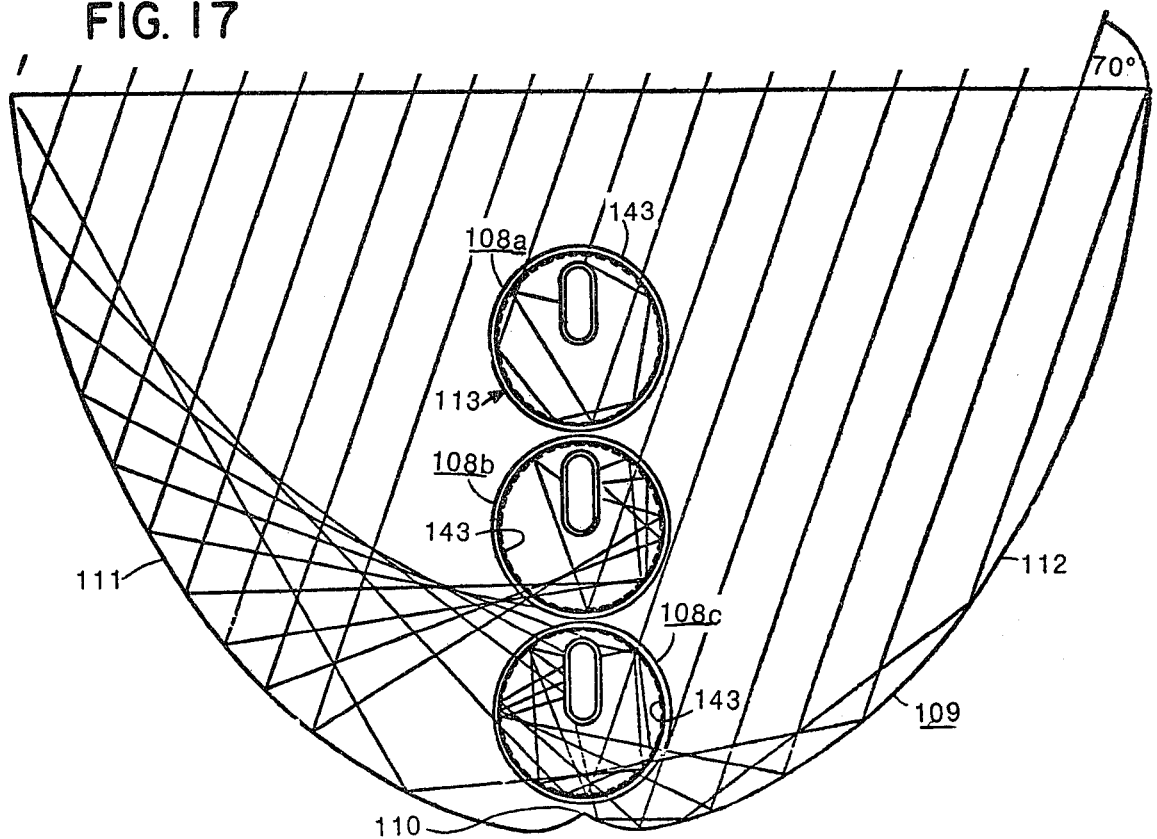
FIG. 17 shows another embodiment of a solar energy collecting unit with solar radiation incident at an angle of 70° with the collecting unit.

FIG. 17 shows another embodiment of a solar energy collector. Solar energy collectors 108a, 108b and 108c are identical to collector 92 shown in FIG. 14 except that the glass enclosure 94 is one-way transmissive to solar radiation. One-way transmissive glass enclosure 94 allows solar radiation to enter glass enclosure 94, but once the solar radiation enters glass enclosure 94, a substantial portion of the solar radiation is reflected upon pipe 93. The internal surface of glass enclosure 94 is coated with a partially reflective coating 143. Coating 143 can be any suitable metallic film such as partial silvering. It should be understood that energy collectors 108a, 108b and 108c have the advantage that a substantial portion of the solar radiation entering glass enclosure 94 is eventually reflected to pipe 93. Reflection of solar radiation out of glass enclosure 99 is reduced by the above structure.

Energy collectors 108a, 108b and 108c are positioned within generally concave reflective trough 109 which provides for concentration of solar radiation on collectors 108a, 108b and 108c. Collectors 108a, 108b and 108c extend vertically from the bottommost portion 110 of trough 109 and are approximately equidistant from outerside portions 111 and 112 of trough 109.

Figure 18:
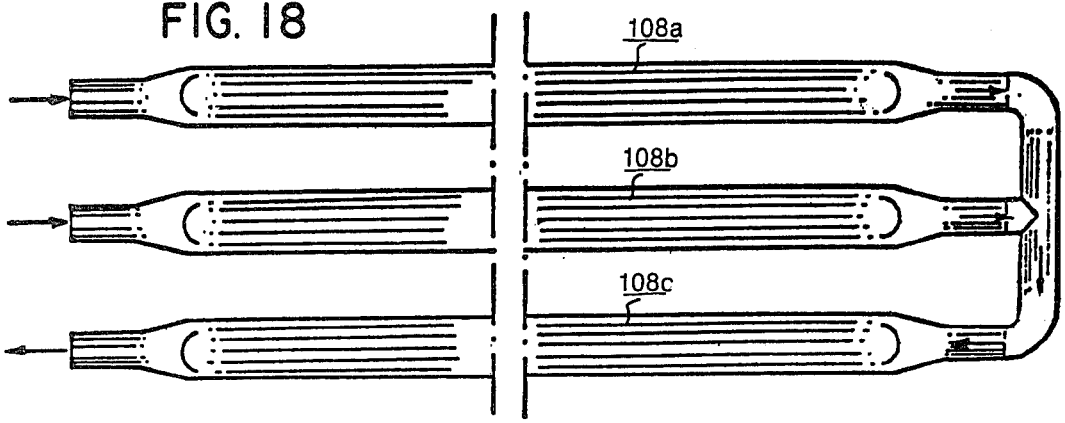
FIG. 18 shows diagrammatically one embodiment of a fluid circuit for the solar energy collecting unit shown in FIG. 17.
Figure 19:
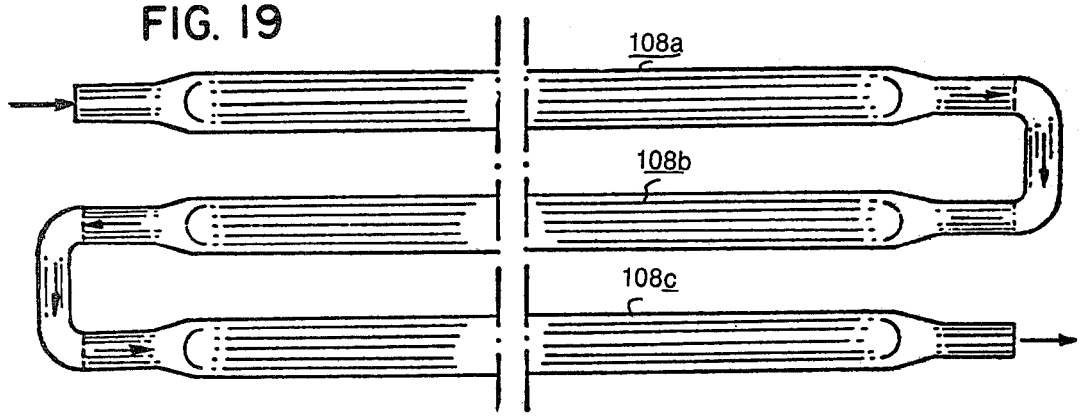
FIG. 19 shows diagrammatically another embodiment of a fluid circuit for the solar energy collecting unit shown in FIG. 17.
Figure 20:
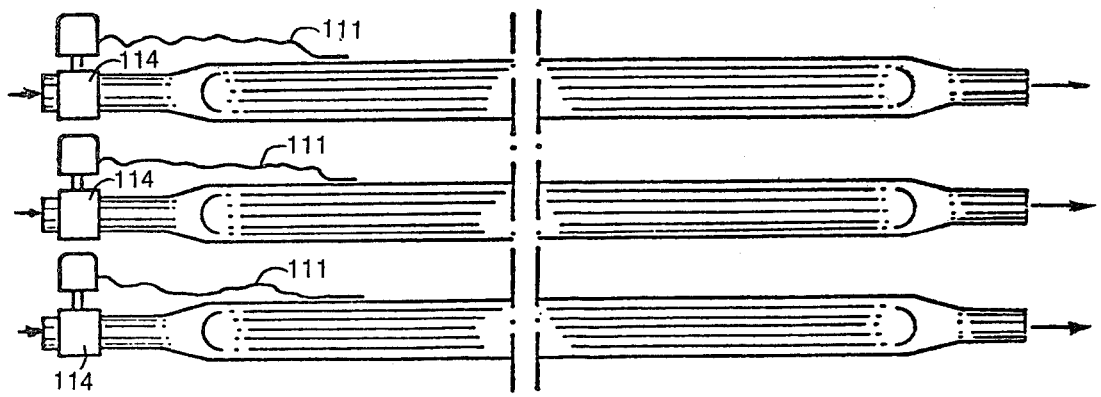
FIG. 20 shows diagrammatically another embodiment of a fluid circuit for the solar energy collecting unit shown in FIG. 17.

FIGS. 18, 19 and 20 show diagrammatically alternative fluid circuits which may be utilized with solar energy collecting unit 113 shown in FIG. 17. As shown in FIG. 18, fluid may be circulated in parallel through energy collectors 108a and 108b and then in series through energy collector 108c. As shown in FIG. 19, fluid may be circulated in series through energy collectors 108a, 108b and 108c. As shown in FIG. 20, fluid may be circulated through three separate circuits associated respectively with energy collectors 108a, 108b and 108c. Solenoid valves 114 open when thermostats 111 reach a predetermined temperature and fluid is circulated to the respective collectors 108a, 108b and 108c.

Another embodiment of an energy collector is shown in FIGS. 21 to 23. Energy collector 200 includes an elongated hollow glass or plastic enclosure 202 enclosing energy collecting plate 203, preferably made from metal, having 3 channels 204A, 204B and 204C through which is circulated, as appropriate, fluid capable of absorbing heat. The ends of energy collecting plate 203 are connected pipes 206 and 208, as shown in FIGS. 21 and 23, for carrying fluid. As shown in the right portion of FIG. 23, the shape of energy collecting plate 203 includes suitable expansion-contraction bends. Energy collecting plate 203 and hollow enclosure 202 which encompasses it are sealed within tube 210 through which the rays of the sun are capable of passing.

Figure 24:
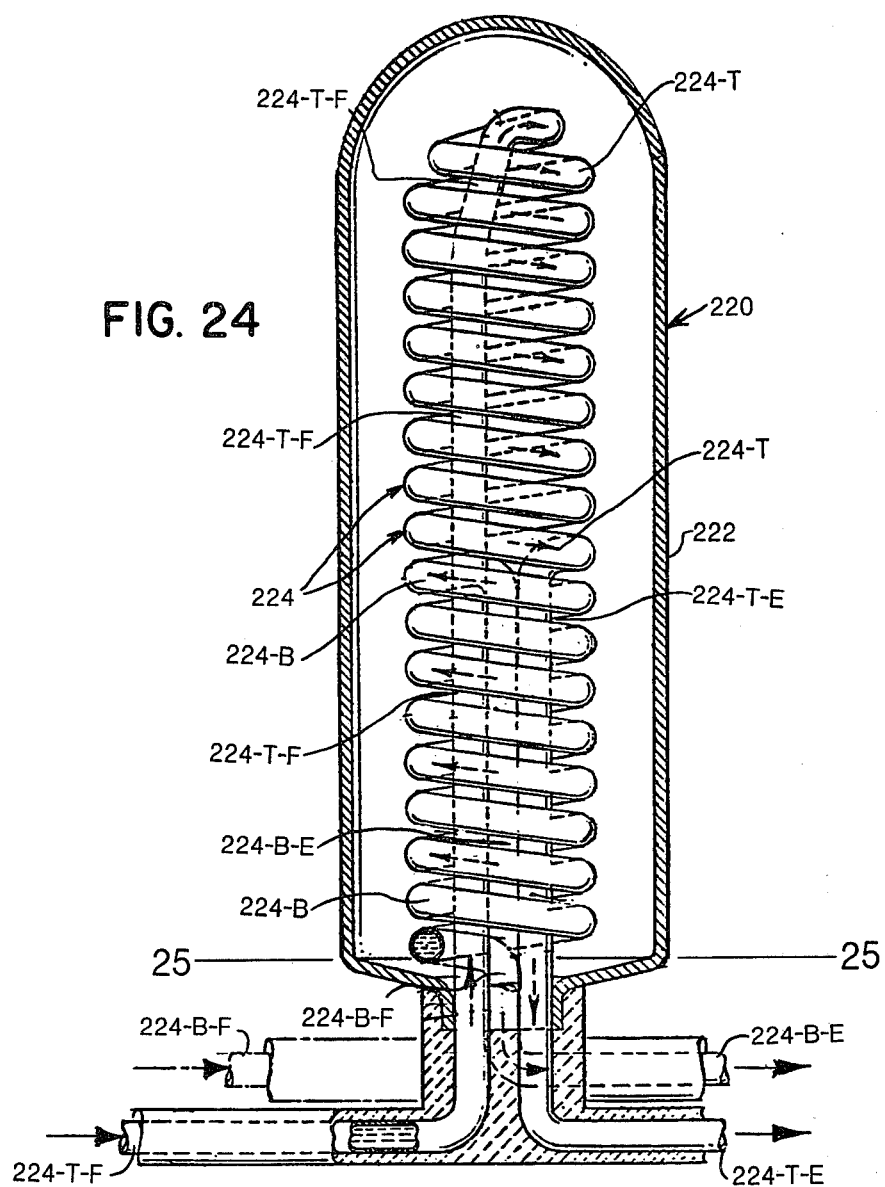
FIG. 24 shows another embodiment of a solar energy collector.
Figure 25:
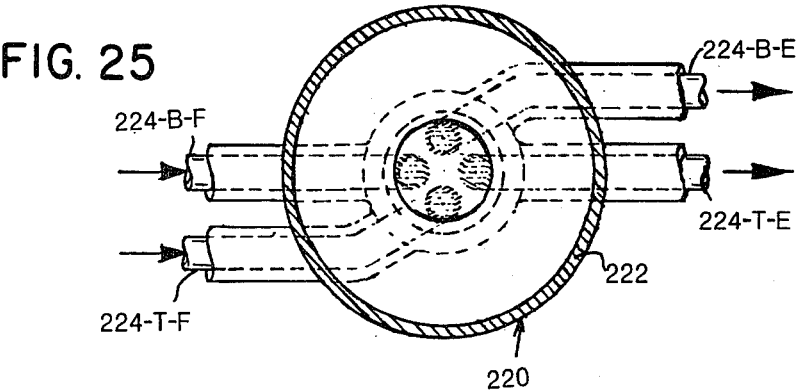
FIG. 25 is a plan section taken along 25—25 of FIG. 24.
Figure 26:
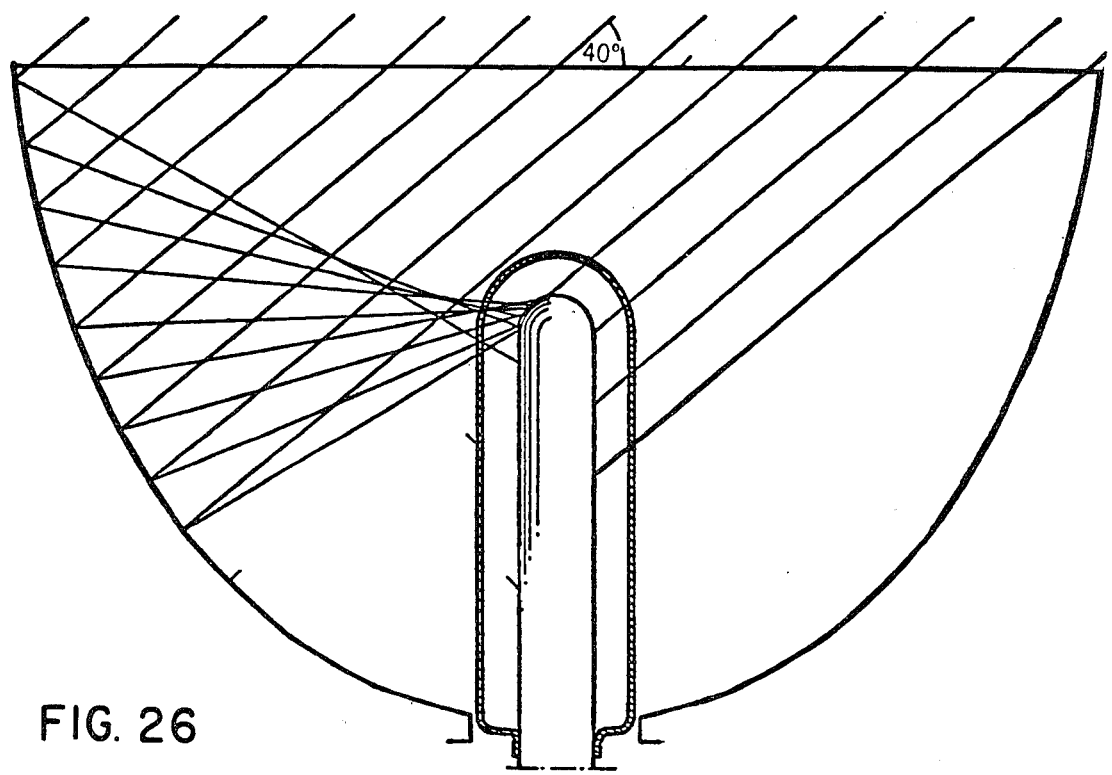
FIG. 26 is a diagrammatic view of a solar energy collecting unit embodying the solar energy collector of FIG. 24 with solar radiation incident at an angle of 40° with the collecting unit.
Figure 27:
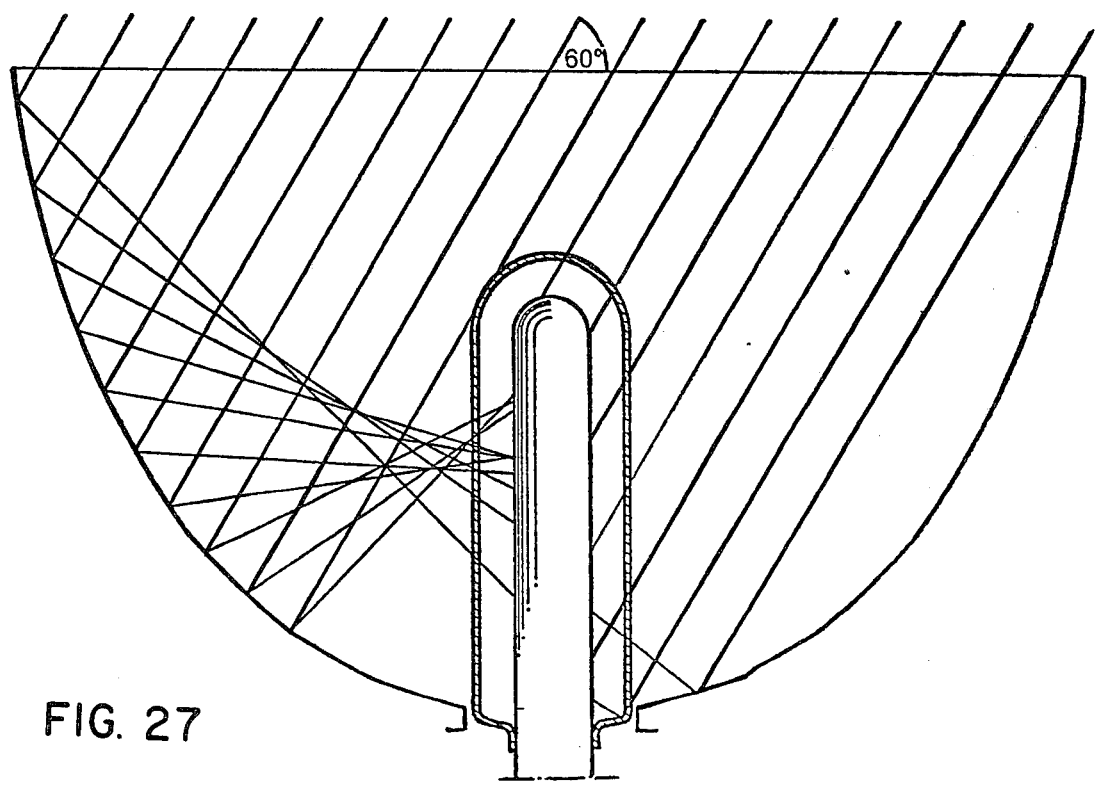
FIG. 27 is a diagrammatic view of a solar energy collecting unit embodying the solar energy collector of FIG. 24 with solar radiation incident at an angle of 60° with the collecting unit.
Figure 28:
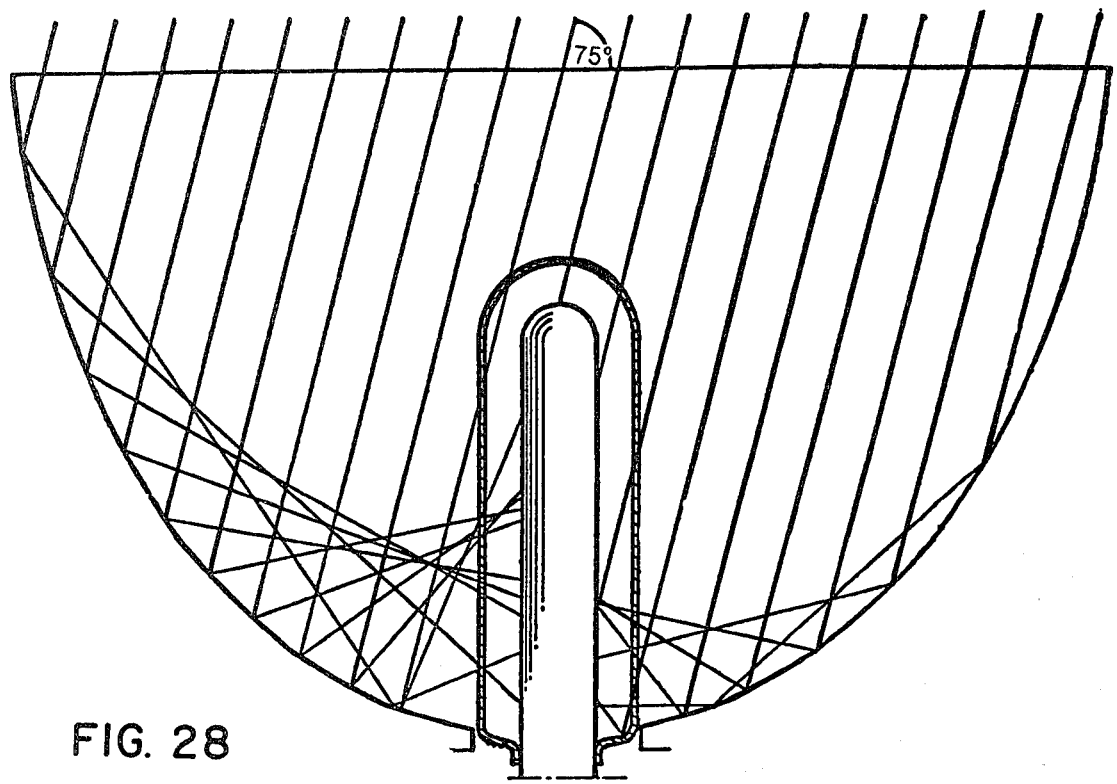
FIG. 28 is a diagrammatic view of a solar energy collecting unit embodying the solar energy collector of FIG. 24 with solar radiation incident at an angle of 75° with the collecting unit.
Figure 29:
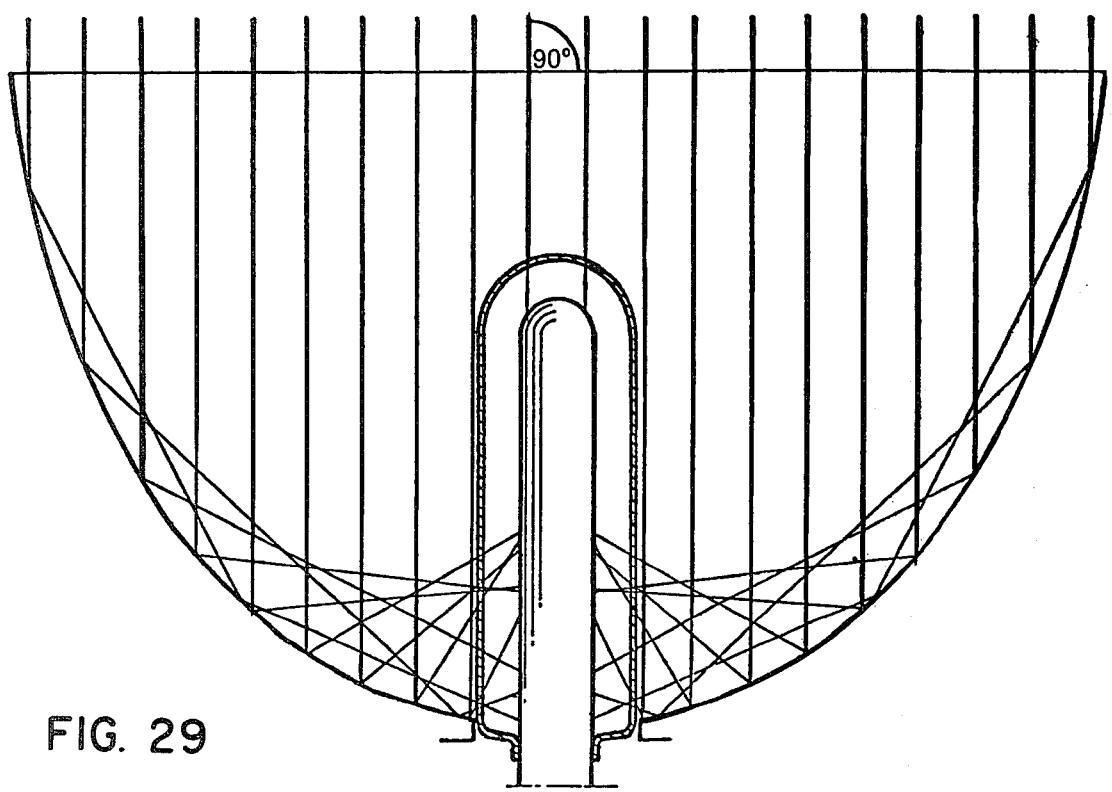
FIG. 29 is a diagrammatic view of a solar energy collecting unit embodying the solar energy collector of FIG. 24 with solar radiation incident at an angle of 90° with the collecting unit.

Another embodiment of a solar collector is shown in FIGS. 24 and 25. The collector of these figures is designed for use in a collecting unit that includes concave reflecting surfaces, like the collectors described above, but is designed for particularly advantageous use with concave reflecting surfaces in the form of a soup bowl, in contrast to the trough-like form of the reflecting surfaces described previously. As can be seen in FIGS. 26 to 29, solar radiation is concentrated at different times during the day on different portions of an upstanding collector positioned in a concave reflecting surface. The collector of FIG. 24 and 25 is designed so that only the hottest fluid of the collector can be circulated.

With reference to FIG. 24, solar collector 220 includes enclosure 222 through which solar rays pass and coils 224 through which fluid can be circulated. Coils 224 consist of independent sections, as exemplified in FIG. 24, a top coil section 224-T and a bottom coil section 224-B. Fluid is fed to top coil section 224-T through insulated pipe 224-T-F and exits from top coil section 224-T through insulated pipe 224-T-E. Fluid is fed to bottom coil section 224-B through insulated pipe 224-B-F and exits from bottom coil section 224-B through insulated pipe 224-B-E.

Figure 30:
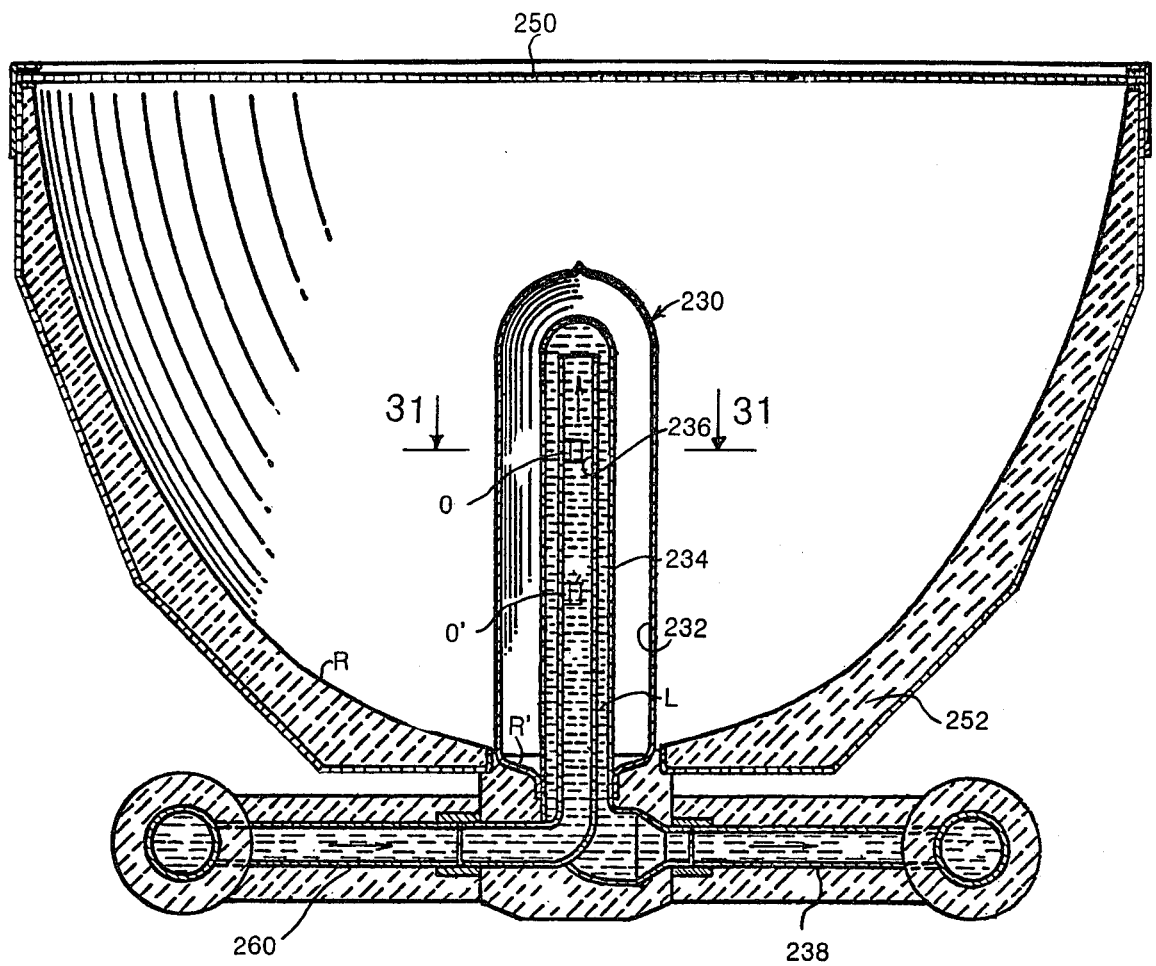
FIG. 30 shows another embodiment of a solar energy collecting unit.
Figure 31:
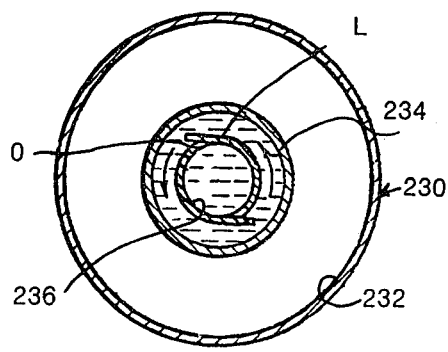
FIG. 31 is a plan section taken along 31—31 of FIG. 30.

Still another embodiment of a solar energy collecting unit is shown in FIGS. 30 and 31. This unit is similar to the type of unit which can be used advantageously with the collector shown in FIGS. 24 and 25 in that both units can be described as having a similarity to an automobile headlight.

The collecting unit shown in FIGS. 30 and 31 is designed so that circulating fluid is heated to a relatively high temperature, heat loss from the circulating fluid is minimized and the hot fluid is capable of quickly being removed from the collector to storage. The collector 230 comprises an evacuated tube 232, the walls of which admit solar radiation which is absorbed by collecting pipe 234 to heat the circulating liquid L. Tube 232 and collecting pipe 234 are in sealed relationship to maintain the vaccuum of tube 232. Feed pipe 236 is positioned within collecting pipe 234 and is provided with openings 0 and 0' which open into collecting pipe 234.

In operation, liquid is pumped into feed pipe 236, and is heated by transfer of heat from the heated liquid L in collecting pipe 234. The openings 0 and 0' in feed pipe 236 are such that turbulent circulation of the heated liquid is effected as it exits through the openings 0 and 0' into collecting pipe 234 in which the circulating liquid absorbs more heat. The heated liquid exits through pipe 238.

The solar energy collector 230 is positioned in a concave reflecting structure having mirror-like surfaces R for reflecting sun rays onto the collector. The collecting unit is sealed with a protective cover 250 which admits sun rays and is insulated with insulation 252. For greater efficiency, the bottom wall of collector 230 is also a reflective surface $R^1$. Also for improved efficiency, the feed and exit pipes are covered with insulation 260.

The solar energy collecting system of the present invention is described in the context of a system used to heat a liquid. It should be understood that the system can be employed for purposes such as steam production or distillation. Moreover, the system is adaptable for the conversion of solar energy into electricity by employing solar cells in place of or in addition to pipes for fluid circulation and solar energy absorption.

The system described is capable of heating heat transfer fluid to a relatively high temperature and, if desired, used to provide energy for operating the heating or air conditioning units of a building. The energy from the hot fluid can be stored for future use. The system is capable of operating in a manner such that throughout any given day, fluid having relatively high temperatures can be collected inasmuch as the solar radiation is concentrated on various collectors, depending on the position of the sun.

I claim:
1. A solar energy collecting unit including:
(A) solar energy collectors comprising:
  (i) a first and a second elongated concavely shaped wall, both walls extending in generally parallel relation to each other, each wall having an innerside portion and an outerside portion, at least part of said first wall and at least part of said second wall being reflective of solar radiation;
  (ii) a wall transmissive to solar radiation extending from said outerside portion of said first wall to said outerside portion of said second wall;
  (iii) a first means for transferring energy away from said collector and positioned between said transmissive wall and said first wall and second means for transferring energy away from said collector and positioned between said transmissive wall and said second wall; and
  (iv) said first and said second means positioned with respect to said reflective walls and with respect to said transmissive wall to provide space capable of insulating said first and second means; and
(B) a generally concave reflective trough including a bottommost portion and two outerside portions; wherein a plurality of said collectors is positioned within said trough.

2. A solar energy collecting unit according to claim 1, wherein said transmissive walls of said collectors face toward said generally concave reflective trough.

3. A solar energy collecting unit according to claim 2, wherein said plurality of collectors include a first, a second and a third collector, and wherein said transmissive portions of said first, second and third collectors face respectively one outerside portion, the bottommost portion and the other outerside portion of the trough.

* * * * *